ZONING CIRCUITS FOR A CHARACTER READER

Filed Aug. 28, 1964 3 Sheets-Sheet 1

INVENTOR.
JOHN P. BELTZ
BY John V. Regan
Attorney

Feb. 21, 1967 J. P. BELTZ 3,305,835

ZONING CIRCUITS FOR A CHARACTER READER

Filed Aug. 28, 1964 3 Sheets-Sheet 2

INVENTOR
JOHN P. BELTZ
BY John V. Regan
Attorney

INVENTOR
JOHN P. BELTZ
BY John V. Regan
Attorney

United States Patent Office 3,305,835
Patented Feb. 21, 1967

3,305,835

ZONING CIRCUITS FOR A CHARACTER READER

John P. Beltz, Willingboro, N.J., assignor to Radio Corporation of America, a corporation of Delaware Filed Aug. 28, 1964, Ser. No. 392,797
6 Claims. (Cl. 340—146.3)

This invention relates to character readers, and more particularly to character recognition methods and circuits for use in such readers.

Certain character readers read documents by scanning each character printed on the document by a plurality of successive vertical scan lines to generate serially occurring video signals. The video signals occur whenever the outline trace of a character is intercepted in a scan line and the succession of video signals serially represent the topographical features of the character. The topographical features of a character may include, among other things, the strokes into which the outline trace of a character is divisible. In stylized fonts, such as a matchstick font, the horizontal and vertical strokes comprise the major portion of the outline traces of the characters.

The characters to be read may, for example, be printed on a document by a computer-operated high speed printer of the drum type, the chain type, or the like. In drum and chain printers complete characters are formed on type bars which are selectively energized to strike an inked ribbon to produce inked impressions of the characters on the document being printed. Such high speed printers frequently print a distorted version of the character. For example, in drum type printers either the top or the bottom portions, i.e., the top or bottom horizontal strokes of a character, may not be printed at all while the vertical strokes may be bowed or curved rather than straight up and down. Such distorted characters are difficult but not impossible to recognize.

Recognition of such distorted characters is accomplished by detecting only the reliable features contained in the outline trace of such characters. The major reliable features in these characters are their vertical strokes. Such strokes are rarely omitted when the characters are printed. Furthermore, a stylized matchstick font aids in emphasizing such vertical strokes. Another feature which aids in recognizing the distorted characters is the white gap that occurs between the horizontal strokes in the characters. Even though one or both the top and bottom horizontal strokes in some characters are omitted when the characters are printed, it is still possible to detect white gaps therein, as will be explained in more detail subsequently.

The recognition of both normal and distorted characters is based on the fact that characters may be differentiated from each other by detecting the locations or zones in each character in which the features of the character occur. Thus, the positions of the features within the characters are detected by the character reader along with the feature itself for accurate recognition. This requires that the characters be divided into a plurality of portions or zones, i.e., upper, lower, left, right, etc., and the features detected be recorded as occurring in particular zones. Such divisions pose no problems when a character is divided into horizontal zones because a count of scan lines in either a synchronous system or an asynchronous system give the exact boundaries of the horizontal zones to insure an accurate horizontal location of the features.

It is difficult however to determine from which vertical zone a vertical stroke is detected because some characters in a line of print may be misaligned, the document itself may be skewed, etc. Therefore, if an easily obtainable fixed reference point, such as the start of a scan, is utilized to determine the vertical zones, then incorrect readings occur when the misaligned or skewed characters are read. Alternatively, if the top or bottom of the character itself is utilized as the reference point, then incorrect readings occur when distorted characters, with the tops or bottoms missing, are read. Therefore, certain character readers utilize the detection of the first major reliable feature, such as a vertical stroke, to establish a reference point from which the remaining features in a character are referenced in order to determine in which vertical zones the detected features belong. Such character readers may for example classify the first vertical stroke detected as occurring in the upper zone of a character. If another vertical stroke in the character is detected in succeeding scans above the positioning of the first vertical stroke, then the first vertical stroke is reclassified into a lower zone category. Alternatively, if the other vertical stroke in the character is detected in succeeding scans below or on the same level as the position of the first vertical stroke, then the first vertical stroke is not reclassified. Such a recognition system depends on accurately locating the first stroke that occurs in a character so that the remaining features in the character may be correctly positioned with reference thereto.

Accordingly, it is an object of this invention to provide an improved character reader capable of recognizing distorted characters.

It is another object of this invention to provide an improved character reader which detects reliable features in a character and accurately positions the features relative to each other.

It is still another object of this invention to provide an improved character reader which correctly determines the first major feature detected in a character and then accurately positions the remaining features of the character relative thereto.

It is a further object of this invention to provide an improved character reader which correctly locates the first stroke detected in a character and then accurately positions the remaining features of the character relative thereto.

A character reader in accordance with the invention reads characters printed on a document by scanning the characters to derive video feature signals serially representing the topographical features of the characters. A predetermined and reliable feature, such as the first vertical stroke which occurs in a character, is classified when detected into a prescribed category indicating the position of that feature within the character. The character is divided into a plurality of vertical zones commencing when the said predetermined feature is detected and the remaining features detected in the character are classified depending on the zones in which they are detected. If the said predetermined feature is redetected in a succeeding scan in the same horizontal zone of said character but in a higher vertical zone than it was detected initially, then the character reader restarts the vertical zoning of the character to rezone the character. The rezoning commences when the predetermined feature is redetected and the remaining features are referenced to the vertical zones as established by the rezoning.

In the drawings:

FIGURE 1 is a schematic block diagram of a character reading system embodying the invention;

FIGURES 2*a*, 2*b* and 2*c* are diagrammatic illustrations of the scanning of an individual character in the character reader of FIGURE 1 and the zones into which characters may be divided; and FIGURES 3*a* and 3*b*, comprise a schematic block diagram of a character recognition system embodying the invention.

*General*

Referring now to FIGURE 1, a schematic block diagram of a character reading system 10 is illustrated. The system includes a transport mechanism or document handling device 12 for transporting a document 14 having characters 16 printed thereon. The transport mechanism 12 moves the document 14 at a substantially constant velocity past the front of a scanner 18 in the direction of the arrow 17 shown thereon. The scanner 18 may, for example, comprise an electronic scanning system such as a Vidicon camera tube system or alternatively may comprise a mechanical rotating disc scanning system of the Nipkow type. The characters 16 are normally printed in a horizontal line on the document 14 and the characters are scanned by a plurality of vertical scan lines in a raster type scanning. The scanner 18 provides one dimension of the raster, i.e., the vertical, whereas the movement of the document 14 by the transport mechanism 12 provides the other dimension, i.e., the horizontal. The scanner 18 generates video signals when the outline trace of a character is intercepted which serially represent the topographical features of the characters 16.

The video signals are applied to a video processing and quantizing circuit 19 which processes the video signals to provide uniform amplitude pulses having fast rise and fall times. The quantized video signals are applied to a character recognition system 20, wherein the video signals are recognized as particular characters and encoded into a digitalized form, such as a binary coded form.

The document transport 12 also includes a document presence generator (not shown) which generates a document presence signal level when the transport mechanism 12 positions a document 14 in the scanning area. The scanner 18 also generates a start scan pulse at the beginning of each scan. Both the document presence signal level and the start scan pulse are applied to the character recognition circuits 20 to initiate the detection and recognition processes. The coded output signals from the character recognition circuits 20 are applied to an output circuit 22 which may, for example, comprise a storage medium for storing the signals or a computer for further processing the signal.

*Character scanning*

In FIGURE 2*a* is shown the manner in which an individual character, the numeral 9, is scanned by the scanner 18. The character 9 is shown distorted to aid in understanding the invention. A character is scanned from top to bottom while the character is simultaneously moved from left to right by the transport mechanism 12. Thus, each character is scanned both substantially orthogonally and successively by a plurality of substantially vertical scan lines 30 commencing at the right and ending at the left of the character. In FIGURE 2*a*, six scan lines numbered 1 to 6 are shown as scanning the character. Other scanning patterns, of course, may be utilized if desired. For example, the scanning may commence at the left and end at the right of a character. However, in the scanning pattern shown in FIGURE 2*a*, the least significant digit is scanned first by the scanner 18 when reading numeric characters, which permits ease of adding the numeric characters in an output computer. Each scan line 30 commences near a line 32 toward the top of a document 14 and ends near a terminal line 34 underneath the character and toward the bottom or the document. As will be described more fully later in the specification, each scan line 30 is clocked by a plurality of timing intervals generated in the character recognition circuit 20. The timing intervals are indicated as the spaces between the horizontal dashes formed vertically in FIGURE 2*a*. Each character is normally formed such that a scan line takes fourteen timing intervals to traverse the character from top to bottom. Such a timing interval will be referred to as an element. For purposes of explanation throughout the specification, elements will be utilized to measure time as well as distance.

*Feature zoning*

It is apparent that the features to be detected in a character, such as the vertical strokes, occur only in particular portions or zones of different characters. For example, the numeral 9 to be scanned in FIGURE 2 includes an upper-right stroke (URS) and a lower-right stroke (LRS) as well as an upper-left stroke (ULS). The numeral 2 (not shown) includes a lower-left stroke (LLS) and an upper-right stroke (URS). The numeral 7 (not shown) includes a lower-center strokes (LCS), whereas the numeral 1 (not shown) includes both upper and lower-center strokes (UCS and LCS). Thus, the features of a character are classified as occurring in upper and lower vertical zones UZ and LZ, respectively, as well as right, center and left horizontal zones RZ, CZ and LZ, respectively.

The right, center and left horizontal zones are selected to comprise two of the six scans of a character in a synchronous zoning or scanning system. The horizontal zones are therefore determined by a fixed reference, i.e., a count of scan lines. Thus, the exact horizontal positioning of the features detected when scanning a character is readily obtained.

The positioning of the vertical strokes detected in a character is determined by dividing each scan line into an equal number of sections commencing when the first vertical stroke is detected in a character. The succeeding strokes are then referenced to the first vertical stroke to ascertain their location within the character. This may be seen by referring to FIGURES 2*b* and 2*c*. In FIGURE 2*b*, the scan A detects the first vertical stroke in the character 5, i.e., the lower-right stroke therein, and initiates a scan line sectionalizer. The sectionalizer effectively divides the scan line A and all succeeding scan lines into an equal number of sections, in this case six. The section in which the first vertical stroke occurs is designated section 1 (S1). The sections of the scanline occurring after section 1 (S1) are designated section 2 (S2), etc., up to section 6 (S6). A vertical stroke extends somewhat beyond the limits of a section. Thus, portions of the lower-right stroke also occur in sections S2 and S6. The stroke in scan line A is automatically classified as an upper-right stroke since it is the first stroke detected in the character. In the succeeding scans, the detected vertical strokes are referenced to the first stroke by noting the scanning sections in which they are detected. Thus, in scan line B, a vertical stroke is detected in the scanning section 6 (S6) which is the section immediately preceding the scanning section 1 (S1). This section occurs before section 1 so therefore the first vertical stroke must be incorrectly classified because it cannot be an upper stroke if another stroke is detected in a higher location in a succeeding scan line. The first vertical stroke is therefore reclassified (RC) as a lower-right stroke which is the correct absolute position (as contrasted to a machine positioning) of the stroke within the character.

In FIGURE 2*c*, the first vertical stroke, i.e., the upper-right stroke therein, in the numeral 2 is detected in the scan line A and initiates the scanning sectionalizer to start dividing the scan line into a plurality of sections commencing with section 1 (S1). The stroke is classified as an upper-right stroke. Another vertical stroke is detected in section 2 (S2) of the scan line B. Since this vertical stroke is detected in a section immediately succeeding the scanning section 1 (S1), it is determined that the first vertical stroke has been correctly classified as an upper-right stroke.

The logic equations for detecting the six vertical strokes that can occur are:

URS=[(RHZ)(MVS)][(6S)+(1S)($\overline{RC}$)]
LRS=[(RHZ)(MVS)][(2S)+(1S)(RC)]
UCS=[(CHZ)(MVS)][(6S)+(1S)($\overline{RC}$)]
LCS=[(CHZ)(MVS)][(2S)+(1S)(RC)]
ULS=[(CHZ)(MVS)][(6S)+(1S)($\overline{RC}$)]
LLS=[(LHZ)(MVS)][(2S)+(1S)(RC)]
RC=(MVS)(6S)

The meaning of the above abbreviations and others are listed below.

*Abbreviations*

URS=upper-right stroke
LRS=lower-right stroke
UCS=upper-center stroke
LCS=lower-center stroke
ULS=upper-left stroke
LLS=lower-left stroke
RHZ=right horizontal zone
CHZ=center horizontal zone
LHZ=left horizontal zone
MVS=medium vertical stroke
SWG=short white gap
LWG=long white gap
1S=first scanning section
2S=second scanning section
6S=sixth scanning section
RC=reclassify
$\overline{RC}$=not reclassify
H=height
FCH=full character height

*Detailed description*

Figure 1:
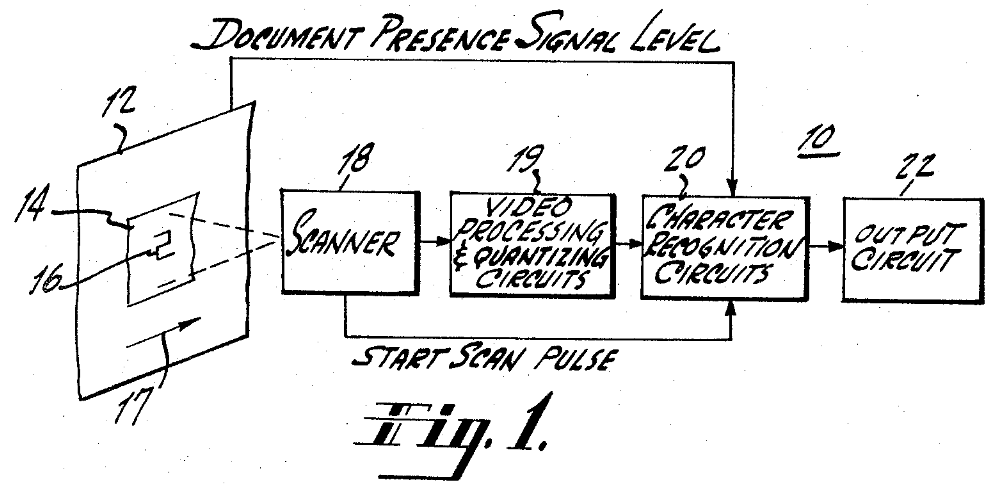

In FIGURE 3, one exemplification of a character reader embodying the invention in illustrated. The document presence signal from the transport mechanism 12 and the start scan pulse from the scanner 18 are applied to an input circuit 50. The input circuit 50 includes a flip-flop 52 which denotes that a document 14 is in the scanning area. The document presence signal is applied through an inverter 51 to the reset terminal R of the flip-flop 52 to reset this flip-flop when a document leaves the scanning area. The document presence signal is also applied as one input to an input AND gate 54. Another input to the gate 54 comprises the reset output signal from the 0 output terminal of the flip-flop 52. The third input to the AND gate 54 comprises a start scan pulse which is delayed in an adjustable delay line 56. The delay line 56, as will be described more fully subsequently, is adjusted to center the effective scanning raster on the characters 16 being read. The AND gate 54 is activated by the simultaneous application of the input signals thereto to produce an output pulse which is coupled through a delay circuit 58 to set the flip-flop 52. The 1 output terminal of the flip-flop 52 produces, when set, a signal which is applied to activate a synchronizer 60.

The synchronizer 60 produces timing pulses which synchronize the scanning of a character with the flow of video signals into the character recognition system 20. The synchronizer includes a clock oscillator or pulse generator 62 which may, for example, produce pulses at a 31 kilocycle rate, or one pulse every 32 microseconds. The clock pulses are applied as one input to a three-input AND gate 64. Another input to the gate 64 comprises the signal derived from the flip-flop 52 while the third input comprises the inverted output of one output terminal of a decimal counter 66. The periodic pulse output of the AND gate 64 is applied to the advance terminal A of the decimal counter 66 to advance the counter 66 from a count of 0 to a count of 39. The count of 39 terminal (CT39) of the counter 66 is coupled through an inverter 68 to the AND gate 64 to deactivate this gate when the 39th pulse in a cycle has been counted. The counter 66 is reset to a count of 0 by applying a delayed start scan pulse derived from the relay circuit 56 in the input circuit 50 to the reset terminal R of the counter 66.

Figure 2A:
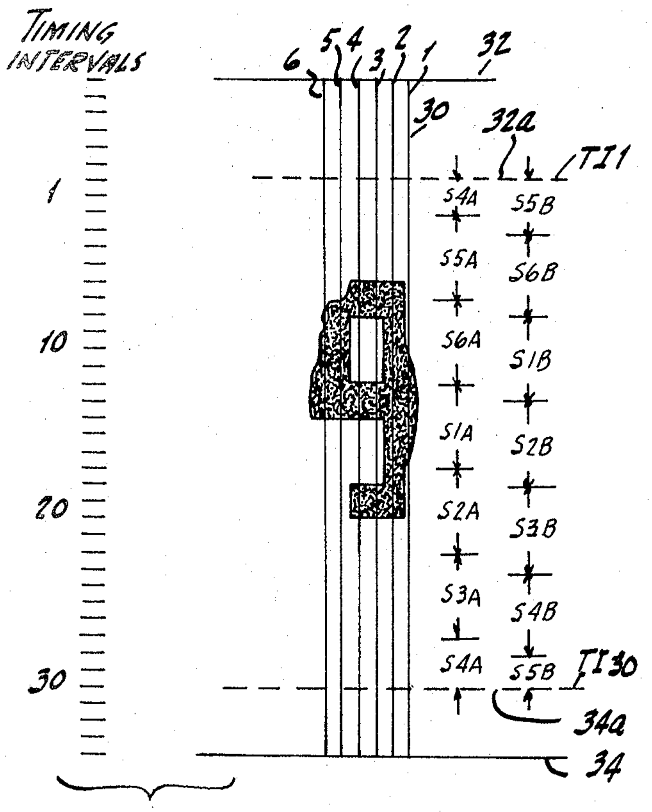
Figure 2C:
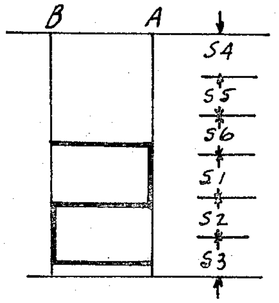
Figure 2B:
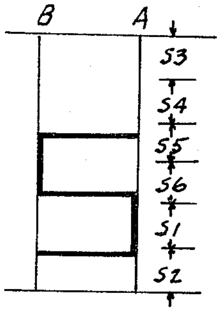

The output of the count of 1 terminal (CT1) of the counter 66 is applied to set a flip-flop 68 which in turn is coupled to enable an output AND gate 70. The gate 70 produces the timing pulses TP in the recognition circuits 20. The clock pulses from the oscillator 62 are applied through an inverter 72 to the other input of the output AND gate 70 to activate the gate 70 to produce a timing pulse a half cycle after a clock pulse is generated in the oscillator 62. The combination of a clock pulse and a timing pulse defines a timing interval as illustrated in FIGURE 2*a*. The count of 31 terminal (CT31) of the counter 66 is coupled to reset the flip-flop 68 at a count of 31 so that the synchronizer 60 produces only groups of 30 timing pulses for synchronization of the video information signals.

The count of 38 terminal (CT38) of the counter 66 is applied as one input to an AND gate 74. The AND gate 74 functions to produce an output pulse at the end of any scan in which no black elements in the video signals are detected. The other input to the gate 74 is derived from the 0 output terminal of a white scan detecting flip-flop 76, which is reset by a start scan pulse derived from the delay circuit 56. The flip-flop 76 is set by a black element stored in the first stage (1B) of an input video shift register 80 to be described subsequently. The output of the AND gate 74 is applied through an OR gate 78 to produce a general reset or clear pulse. The OR gate 78 is also coupled to receive an input from the AND gate 54 in the input circuit 50 to produce a clear pulse when the presence of a document is first detected by the AND gate 54. The general reset or clear pulse is applied to the various registers, flip-flops, etc., to reset them.

An input shift register 80 is included in the character recognition circuit 20 to synchronize the advance of video information signals into the circuit 20. The quantized video signals derived from the video quantizing circuit 19 are applied to the input terminal I of the shift register 80 and shifted into the register by applying timing pulses (T.P.) which are derived from the output AND gate 70 of the synchronizer 60 to the advance terminal A of the register 80. The register 80 is reset by applying a delayed start scan pulse derived from the delay circuit 56 to the reset terminal R thereof.

The shift register 80 may, for example, comprise eleven serially connected stages of flip-flop circuits. Each flip-flop circuit or stage of the register 80 exhibits an output of one level when a video signal containing a black element is stored therein. A video signal contains black elements when the outline trace of a character is intercepted by a scan line. An output of another level is produced by a flip-flop when a white element is stored therein. The video signal contains white elements when the outline trace of a character is not intercepted by a scan line. For convenience, a black element is denoted by the symbol B in FIGURE 3*a*, and a white element is denoted by the symbol W. The B signals are taken from one output side of the flip-flops in the register 80, while the W signals are taken from the other output side thereof. The signals are applied through a bus 82 to other circuits in the recognition system. For convenience, the individual connections from the bus 82 to the other circuits are denoted 1B, 2B, etc., when derived from the 1 output sides of the corresponding flip-flop stages in the register 80 and denoted 4W, 5W, etc., when derived from the other output sides of the corresponding flip-flop stages.

The video signals synchronized or digitized in the shift register 80 are applied to a vertical stroke detector 90. A medium vertical stroke is defined as a feature which is five black elements high and which does not contain more than single and separated white elements therein.

Thus, 2B and 4B signals from the register 80 are applied as inputs to an AND gate 92, the output of which is coupled to OR gate 94. The other input to the OR gate 94 is a 3B signal. The output of the OR gate as well as clock pulses derived from the clock generator 62 are applied along with 1B and 5B signals to an output AND gate 96. The AND gate 96 produces an output signal when a medium vertical stroke has been detected. The AND gate 96 is coupled to set a flip-flop 98. The flip-flop 98, which is reset at the end of every scan by the output from the count of 37 terminal (CT37) of the counter 66 in the synchronizer 60, has its 1 output terminal coupled to a one-shot multivibrator 100. The one-shot multivibrator 100 produces an output pulse denoting that a medium vertical stroke (MVS) has been detected in a scan line during scanning a character. The pulse is coupled through an OR gate 102 to provide the output from the circuit.

Additionally, the vertical stroke detector 90 also includes circuitry to detect a long vertical stroke such as those that occur in the numerals 8 or 0 from a matchstick font. Thus, the 8B and 10B signals from the shift register 80 are applied to an AND gate 104. The output of the gate 104 is coupled through an OR gate 106 to provide one input to an AND gate 108. The other input to the OR gate 106 comprises a 9B signal from the shift register 80. Similarly, the other inputs to the AND gate 108 comprise clock pulses from the clock generator 62, as well as 7B and 11B signals from the initial shift register 80, and an output pulse from the AND gate 96 denoting that a medium vertical stroke is stored in the register 80. Thus, a long vertical stroke is effectively defined as two medium vertical strokes that occur in the same scan line. The output of the AND gate 108 provides the other input to the OR gate 102.

A short white gap detector 110 is included in the character recognition circuits 20 to detect horizontal strokes that occur in some characters such as the horizontal strokes in the 5, 2, etc. A short white gap is effectively defined as at least a pair of black elements which are separated by no more than five white elements but by more than two white elements and which occur in the center zone (CZ) of a character. Thus, the detector 110 measures in effect the short white gaps between the top and middle horizontal strokes and the middle and bottom horizontal strokes in a single scan in the center zone of an undistorted character. The detector 110 also measures the short white gap in a distorted character having a top or bottom horizontal stroke missing by measuring the white gaps between the middle horizontal stroke and the remaining top or bottom horizontal stroke in two scans of the character.

The 1B and 2B signals from the initial shift register 80 are applied to an OR gate 112. The output of the OR gate is applied to a multiinput AND gate 114. The other inputs to the AND gate 114, which are derived from the shift register 80, comprise the 7B, 4W, 5W, 10W and 11W signals. The remaining inputs to the AND gate 114 comprise a center zone (CZ) signal derived from a horizontal zone indicator 130 (to be described subsequently), a signal applied from the 0 output terminal when the flip-flop 116 is reset, and inverted count of two signals derived from a counter 118, and the clock pulses from the oscillator 62. The output terminal of the AND gate 114 is coupled to set the flip-flop 116. The flip-flop 116 is reset by a 7W signal from the register 80. The 1 output terminal of the flip-flop 116 is coupled to the advance terminal A of a counter 118 to advance the counter 118 by a count of 1 each time the flip-flop 116 is set. The counter 118 is reset to zero by a clear pulse applied to the reset terminal R thereof. The count of 2 terminal (CT2) of the counter 118 is coupled through an inverter 120 to provide one of the inputs for the AND gate 114. Thus, as will become more apparent subsequently, the counter 118 provides an output when a white gap has been detected twice and then inhibits the detection of any further horizontal strokes.

The absence of a long white gap ($\overline{LWG}$) is detected in a detector 121 to recognize characters such as a 2 and a 5 wherein both the top and bottom strokes are missing and the characters appear similar to (⊣) and (⊢), respectively. The short white gap detector 110 cannot recognize such distorted characters because the characters only include one horizontal stroke and thus do not define a short white gap.

The detector 121 includes an input AND gate 122 which detects a horizontal stroke by detecting a black crossing in the video signals. A black crossing is effectively defined as a transition from two successive white elements to a black element in a scan. Thus, the gate 122 is coupled to the 1B, 2W and 3W terminals of the shift register 80 to be activated each time a black element appears in a scan immediately after two successive white elements. The output of the AND gate 122 is coupled to a counter 123 which counts the number of black crossings that occurred in a scan. The counter 123 is reset to zero at the end of every scan by applying to the reset terminal R thereof an output signal from the terminal CT38 of the counter 66 in the synchronizer 60.

The output of the gate 122 is also applied as one input to a pair of AND gates 124 and 125. The other inputs to the gates 124 and 125 comprise signals denoting that sections S1 and S6, respectively, of a scan are being scanned. The origin of these signals will be described subsequently. The outputs of the gates 124 and 125 are coupled to the set terminals S of the flip-flops 126 and 127, respectively. The flip-flops 126 and 127 are reset at the end of every scan by an output signal from the terminal CT38 of the counter 66 in the synchronizer 60. The 1 output terminal of the flip-flop 126 is coupled to one input terminal of a multiinput AND gate 128. The other inputs to the gate 128 comprise a count of 1 (1BC) in the counter 123, a center zone (CZ) signal from the zoning indicator 140, a count of 37 (CT37) from the counter 66, and the output of inverters 129 and 131. The 1 output terminal of the flip-flop 127 is coupled to a multiinput AND gate 130 which has similar inputs as the gate 128. The outputs of the gates 128 and 130 are coupled to advance counters 132 and 133, respectively. The counters 132 and 133 are reset to zero by clear pulses. The outputs of the count of 2 (CT2) terminals of the counters 132 and 133 are fed back through the inverters 129 and 131, respectively, to apply disabling signals to the gates 128 and 130, respectively. The output of the count of 2 (CT2) terminal of the counter 132 is applied to an output AND gate 134 along with a signal $\overline{LRS}$ denoting the absence of a lower-right stroke, and a signal denoting the presence of a lower-left stroke (LLS), the origins of which will be described subsequently. Similarly, the output of the count of 2 (CT2) terminal of the counter 133 is applied to an output AND gate 135 along with a signal $\overline{URS}$ denoting the absence of an upper-right stroke and a signal denoting the presence of an upper-left stroke (ULS), the origins of which will also be described subsequently. Both the gates 134 and 135 produce the absence of long white gap signals, $\overline{LWG}$, and detect the presence of distorted numerals 2 and 5, respectively.

A horizontal zoning indicator 140 is provided in the character recognition circuit 20 to divide a character into horizontal zones as determined by a count of the scan lines as the character is being scanned. Thus, the horizontal zone in which a feature is detected is determined by the indicator 140. The indicator 140 includes an input AND gate 142. One of the inputs to the gate 142 is derived from the count of 37 terminal of the counter 66. The second input is a signal from the 1 output terminal of a flip-flop 152 (FIGURE 3*b*) which denotes that a character is present, as will be described subsequently. The third input is an inverted left zone LZ signal denoting that the left side of a character has not been scanned. The input AND gate 142 is coupled to a three-stage binary counter 143 which includes three triggerable flip-flops 144, 145 and 146, all of which are reset by a clear pulse derived from the OR gate 78 in the synchronizer 60. The AND gate 142 is coupled to the trigger input terminal T of the flip-flop 144, whereas the 0 output terminal of the flip-flop 144 as well as the 0 output terminal of the flip-flop 145 are coupled to the trigger input terminals T of the flip-flops 145 and 146, respectively.

An AND gate 147 is activated by signals from the 0 output terminals of the flip-flops 145 and 146 to denote that the right zone RZ of a character is being scanned. An AND gate 148 is activated by signals from the 1 output terminal of the flip-flop 145 and the 0 output terminal of the flip-flop 146 to denote that the center zone CZ of a character is being scanned. Also, an AND gate 149 is activated by signals from the 0 output terminal of the flip-flop 145 and the 1 output terminal of the flip-flop 146 to denote that the left zone LZ of a character is being scanned. The output of the left zone AND gate 149 is applied through an inverter 150 to inhibit the input AND gate 142 when the left zone of a character is being scanned. All of the flip-flops 144, 145 and 146 are reset by applying a clear pulse to their reset R terminals.

Figure 3A:
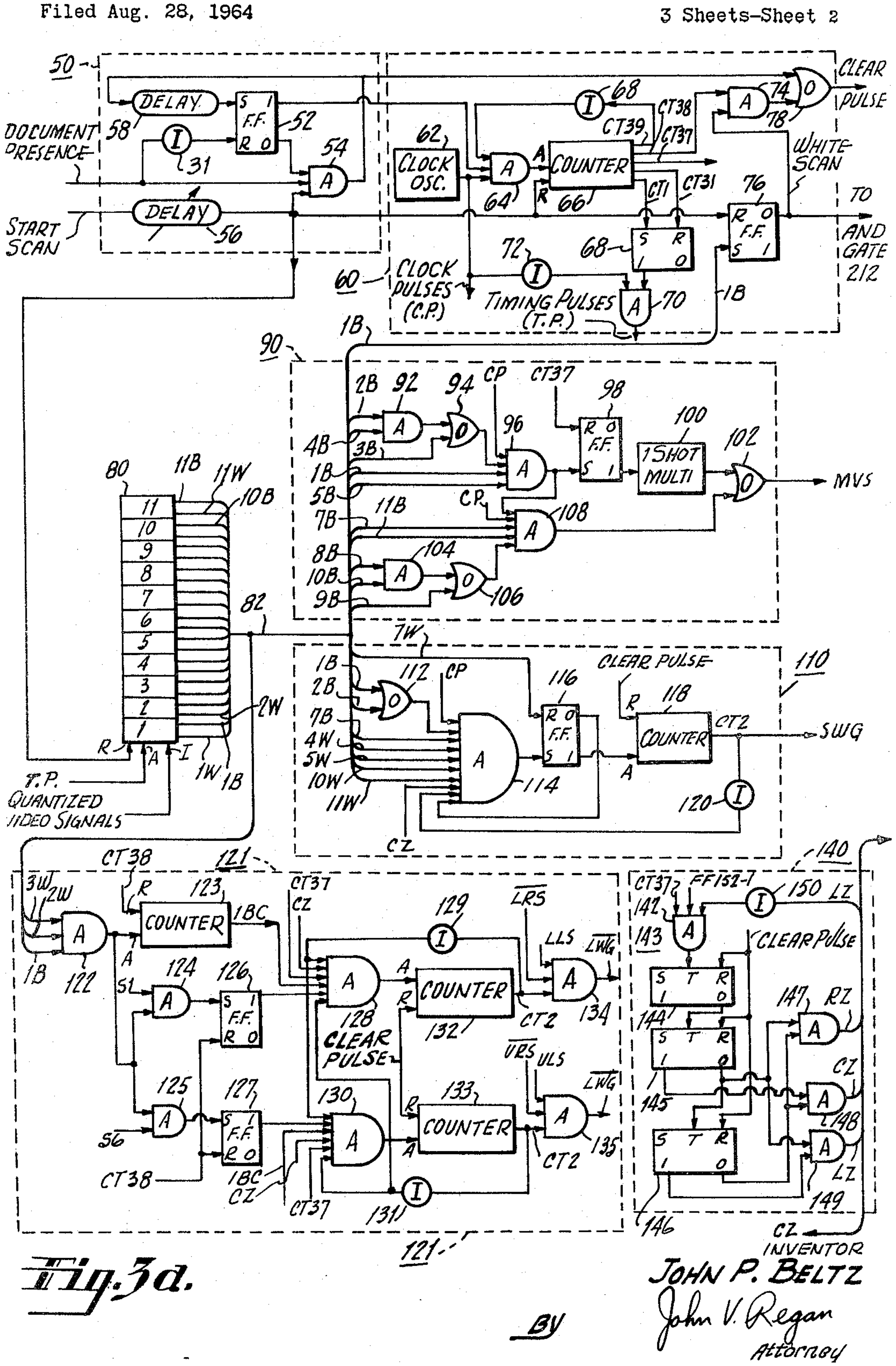
Figure 3B:
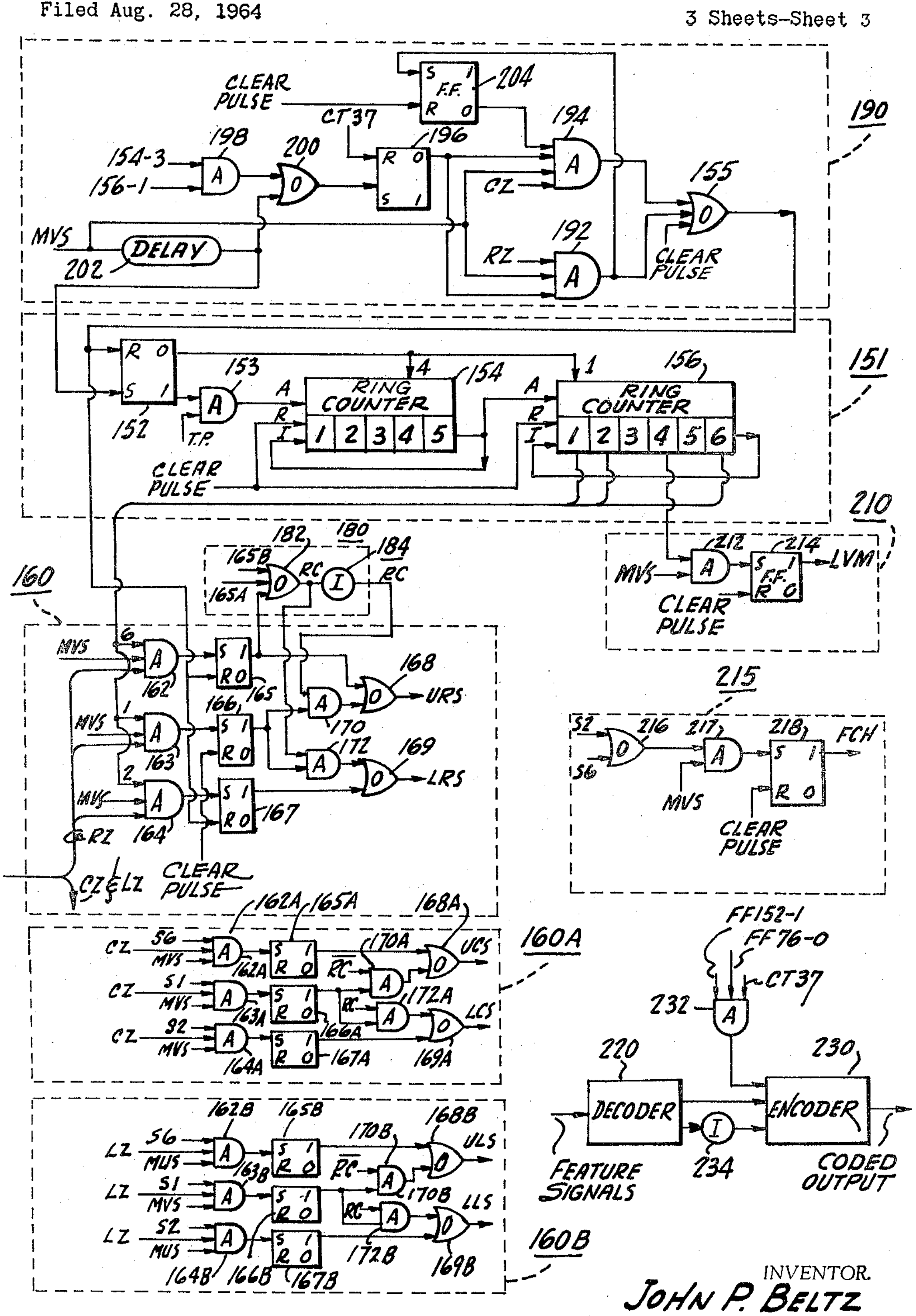

Referring now to FIGURE 3*b*, a scanning sectionalizer circuit 151 is included to divide each scan line into a plurality of equal sections after the first vertical stroke is detected in a character. The sectionalizer 151 includes a flip-flop 152 which is set by a delayed medium vertical stroke (MVS) signal pulse derived from a restart circuit 190. The flip-flop 152 is reset by a clear pulse as well as a pulse output from the restart circuit 190. The flip-flop 152 produces and output from the 1 output terminal which is applied as one input to an AND gate 153. The other input to the AND gate 153 is the timing pulses TP developed in the synchronizer 60. The timing pulses, coupled through the gate 153 when a vertical stroke sets the flip-flop 152, are applied to the advance terminal A of a ring counter 154. The counter 154 includes five stages connected in a ring with the output of the fifth stage of the counter 154 being fed back to the input terminal I of the first stage as well as to the advance terminal A of a second ring counter 156. The second ring counter 156 includes six stages with the output of the sixth stage S6 being fed back to the input terminal I of the first stage S1. The counters 154 and 156 are reset by the pulse output from the OR gate 155 in the restart circuit 190, to be described subsequently, applied to their reset terminals R and then the ring counter 154 is advanced by a count of one for each timing pulse TP applied to the advance terminal A thereof. The ring counter 154 in turn advances the ring counter 156 by a count of one for each count of five in the counter 154. Thus, the counters 154 and 156 count the thirty timing pulses derived from the synchronizer 60 in six sections of five timing pulses each. The counters 154 and 156 are initially set to a count of 4 and 1, respectively, by the resetting of the flip-flop 152.

The character recognition circuits 20 also include a vertical zoning indicator 160 which classifies the vertical strokes detected into upper or lower zone categories. There is one vertical zoning indicator for each horizontal zone in a character and the vertical zoning indicator 160 is for the right zone RZ of a character. The interconnections for the vertical indicator 160 are shown in detail in FIGURE 3, but the zoning indicators 160A and 160B for the center and left zones, respectively, are shown in outline form only. The indicators 160A and 160B are given the same reference numerals as the indicator 160 but an A and a B is appended thereto, respectively, to differentiate these circuits. Thus, the circuit connections being identical to the indicator 160 will not be described in detail.

The right vertical zone indicator 160 includes a plurality of input AND gates 162, 163 and 164. One input to each of the AND gates 162–164 comprises an MVS signal from the OR gate 102 denoting that a vertical stroke has been detected. The second input to each of the gates 162–164 denotes that the right zone of a character is being scanned. The third input to the gates 162–164 comprise, respectively, the outputs of the sixth, first and second stages of the ring counter 156 which denote that these sections in a character are being scanned. The outputs of the gates 162–164 are coupled to the set terminals of the flip-flops 165, 166 and 167, respectively. The flip-flop 166 is reset by a clear pulse. The flip-flops 165 and 167 are reset by a pulse from the restart circuit 190. The 1 output terminals of the flip-flops 165 and 167 are coupled to one input terminal of the OR gates 168 and 169, respectively. The output of the OR gate 168 denotes that an upper-right stroke URS has been detected, whereas the output of the OR gate 169 denotes that a lower-right stroke LRS has been detected. The other inputs to the OR gates 168 and 169 comprise the outputs from a pair of AND gates 170 and 172, respectively. The 1 output terminal of the flip-flop 166 is coupled to provide one input to each of the AND gates 170 and 172. The other inputs to the gates 170 and 172 are derived from a reclassification circuit 180.

The reclassification circuit 180 is coupled to the vertical zoning indicators to reclassify strokes if they are indicated as occurring in the wrong zone. The reclassification circuit includes an OR gate 182 which has as its inputs, signals from the 1 output terminals of the flip-flops 165, 165A and 165B. The output of the OR gate 182 comprises the other input to the AND gates 172, 172A and 172B in the vertical zoning indicators 160, 160A and 160B, respectively. The output of the OR gate 182 comprises a reclassification RC signal. The reclassification signal is also inverted in an inverter 184 to derive a not reclassification $\overline{RC}$ signal. The $\overline{RC}$ signal is applied as the other input to the AND gates 170, 170A and 170B in the vertical zoning indicators 160, 160A and 160B, respectively.

A restart circuit 190 is included in the recognition system 20 to restart the scanning sectionalizer 151 if the vertical zoning of the scan lines and characters is incorrect. The circuit 190 restarts the sectionalizer 151 if the first vertical stroke which initially starts the sectionalizer 151 is redetected in a higher portion of a scan line than it initially appeared.

The circuit 190 includes a pair of input AND gates 192 and 194 to which a medium vertical stroke signal (MVS) derived from the stroke detector 90 is applied. The gate 192 also has applied thereto a right zone signal RZ from the zoning indicator 140 as well as an enabling signal from the 0 output terminal of a flip-flop 196. Thus, the gate 192 is activated only in the right zone and when a medium vertical stroke is detected and the flip-flop 196 is reset. The flip-flop 196 is reset at the end of each scan by a count of 37 (CT37) appearing in the counter 66 (FIGURE 3*a*). The flip-flop 196 is set either by a delayed medium vertical stroke signal or a count of one and three appearing in the ring counters 154 and 156, respectively. Thus, the terminals 3 and 1 of the counters 154 and 156, respectively, are coupled to activate an AND gate 198 on the simultaneous counts of 3 and 1, respectively. The output of the gate 198 is coupled through an OR gate 200 to set the flip-flop 196. The other input to the OR gate 200 comprises a medium vertical stroke signal which is delayed by a delay circuit 202 for one timing interval. The delay circuit 202 is also coupled to the set terminal S of the flip-flop 152 in the sectionalizer 151 to apply a delayed vertical stroke thereto.

The other inputs to the gate 194 comprise a center zone CZ signal from the zoning indicator 140 (FIGURE 3*a*), an enabling signal from the flip-flop 196, as well as a second enabling signal from the 0 output terminal of another flip-flop 204. The flip-flop 204 is reset by a clear pulse. The output of the AND gate 192 is coupled to the set terminal S of the flip-flop 204. Thus, the gate 194 only produces an output in the center zone of a character and when both the flip-flops 196 and 204 are reset. The outputs of the gates 192 and 194, as well as a clear pulse, are applied through OR gate 155 to reset the flip-flop 152 in the scanning sectionalizer 151 and restart the counters 154 and 156.

A long vertical mark LVM circuit 210 is included in the recognition circuits 20 to detect a printed or handwritten mark which is much longer than a character. Such a mark may, for example, be utilized to mark off fields on a document. The LVM circuit 210 includes an input AND gate 212 which has a one input thereto a vertical stroke pulse from the AND gate 96 in the stroke detector 90. The other input to the gate is a count of 4 (S4) in the counter 156. The output of the AND gate 212 is coupled to set a flip-flop 214 which is reset by a clear pulse. The 1 output terminal of the flip-flop 214 provides a long vertical mark LVM signal.

A long vertical mark signal occurs when a vertical stroke is detected while section four (S4) of a scan line in being scanned. Normally, vertical strokes in characters are only detected in sections S1 and S2 or sections S1 and S6 of a scan line. Thus, if a vertical stroke occurs in section S4 of a scan line, the stroke must be appreciably longer than a printed stroke and therefore must comprise a long vertical mark.

A height detector 215 is included to differentiate a full character from a mark or symbol such as a dash, asterisk, etc. The height detector 215 includes an OR gate 216 which is actuated by either a S2 or S6 count in the counter 156. Such a count and the detection of a medium vertical stroke actuates an AND gate 217 to set a flip-flop 218, the 1 output terminal of which denotes a full character height (FCH). The flip-flop 218 is reset by a clear pulse.

All of the various feature signals detected in the character recognition circuits 20 are applied to a decoder 220. The decoder 220 may, for example, comprise a diode decoder matrix which produces a separate recognition signal for each of the characters recognized. The recognition signals are applied to a character encoder 230 which encodes the recognized signal into a binary coded form for transmission to an output circuit. The encoder 230 is activated at the end of scanning a character by a pulse from an AND gate 232 which is activated by the coincidence of a count of 37 in the counter 66, an output signal from the 0 output terminal of the flip-flop 76, both in the synchronizer 60 (FIGURE 3*a*), and an output signal from the 1 output terminal of the flip-flop 152. The decoder 220 is also coupled to an inverter 234 so that when none of the feature signal lines have been activated, the inverter 234 applies a signal to the encoder which denotes that the character is unreadable. The encoder 230 encodes the recognition signal into a binary coded form for further processing.

*Operation*

In describing the operation of the character recognition circuit 20 of FIGURE 3, it will be assumed that the numeral 9 shown in FIGURE 2*a* is being read. The numeral 9 is shown in somewhat of an idealized form of distortion to illustrate the principles of the invention. Such a distorted character may, for example, be printed by a drum printer. The middle portion of a character is spread out more than either the upper or the lower portion of the character. This may be caused by the hammer in the printer striking the middle portion of the type bar stronger than either the top or bottom portion because of the curvature of the drum. The top left portion of the numeral 9 is also shown missing. This may also result from the failure of the hammer to strike the type bar uniformly over the entire surface thereof.

Before a document arrives in the scanning area, the absence of a document presence signal causes the inverter 51 to reset the flip-flop 52 in the input circuit 50 (FIGURE 3*a*). When the document 14 arrives in the scanning area, the transport mechanism 12 produces a document presence signal level which, in conjunction with the 0 output signal from the flip-flop 52, applies an enabling signal to the AND gate 54. The AND gate 54 is activated when a start scan pulse is derived from the delay circuit 56. The start scan pulse may, for example, be generated prior to the top line 32 in FIGURE 2*a* but the delay circuit 56 introduces a delay to cause the effective scanning raster to start at the line 32*a* (FIGURE 2*a*). The delayed start scan pulse is applied to activate the AND gate 54 and the output of the gate 54 generates a clear pulse from the OR gate 78 (FIGURE 3*a*). The pulse output of the AND gate 54 also sets the flip-flop 52 after a delay. The delay is introduced by the delay circuit 53 to permit the clear pulse to reset the various shift registers, flip-flops, etc., in the circuit to their initial state before the AND gate 54 is disabled. The delayed start scan pulse also resets the counter 66 in the synchronizer 60 to a count of zero which removes a disabling signal from the AND gate 64. Consequently, the counter 66 counts the clock pulse from the oscillator 62.

The count of one output from the counter 66 sets the flip-flop 68 to apply an enabling signal to the AND gate 70 in the synchronizer 60. The clock pulses CP from the clock oscillator 62 are inverted in the inverter 72 to activate the gate 70 and produce the timing pulses a half cycle later for the character recognition circuit 20. The clock and hence the timing pulses are counted in the counter 66 which advances by a count of one on the receipt of each clock pulse.

The timing pulses are applied as advance pulses to shift the video signals derived from the scanner 18 (FIGURE 1) into the initial shift register 80 in synchronism with the synchronizer 60. In FIGURE 2*a*, each timing interval equals the sum of a timing pulse and a clock pulse. The timing intervals are numbered correspondingly to the timing pulses, i.e., timing pulse TP1 is considered to occur during the first half of the timing interval TI1. The clock pulse that occurs during the last half of timing interval TI1 is therefore clock pulse 2. Thus, the clock pulses that occur during the timing intervals are numbered one higher than their corresponding timing interval. It is assumed that the beginning of the timing interval TI1 occurs at the line 32*a*. The effective scanning raster, therefore, begins at the dotted line 32*a* at the first timing interval TI1 and ends at the dotted line 34*a* at the end of the thirtieth timing interval TI30. The character itself is assumed to begin at the beginning of the timing interval TI7 and end at the timing interval TI20 because the character 9 is fourteen elements high which is equivalent to fourteen timing intervals. Thus, the character is appreciably over-scanned by the effective scanning raster to allow for any misalignment in the printing thereof.

In the first scan line 1, the bulge at the center of the outline trace of the character 9 is intercepted at the beginning of the timing interval TI11 and the first black element is coupled to the input terminal I of the input register 80 and advanced into the first stage of the register by the timing pulse TP11. The black element in the first stage of the register 80 (1B) sets the flip-flop 76 in the synchronizer 60 to denote that the scan is not a white scan. At the timing interval TI15, five black elements have been advanced into the first five stages of the initial shift register 80 and 1B through 5B signals are applied to the vertical stroke detector 90. The AND gate 96 in the vertical stroke detector 90 is therefore activated by the clock pulse CP16 which occurs during this timing interval. The flip-flop 98 is therefore set. The 1 output signal of the flip-flop 98 triggers the one-shot multivibrator 100 to produce a pulse therefrom. The pulse is coupled through the OR gate 102 to produce a medium vertical stroke pulse. The MVS pulse activates the AND gate 192 in the restart circuit 190 (FIGURE 3*a*) to apply a reset pulse to the flip-flop 152 in the scanning sectionalizer 151. The MVS pulse is also delayed in the delay circuit for one timing interval before being applied to set the flip-flop 152 in the scanning sectionalizer 151. The setting of the flip-flop 152 activates the AND gate 153 to apply the timing pulses TP from the AND gate 70 to the ring counters 154 and 156. The MVS pulse is also applied from the delay circuit 202 to set the flip-flop 196 and prevent another stroke in the same scan from resetting the flip-flop 152 in the sectionalizer 151. The MVS pulse output from the OR gate 102 is also applied to the vertical zoning indicator 160. The AND gate 163 in the indicator 160 is activated by this pulse since the right zone RZ gate 147 is applying one enabling signal thereto and the ring counter 156 is applying the other enabling signal thereto. Thus, the flip-flop 166 is set.

Initially, the counter 154 is set to a count of four, whereas the counter 156 is initially set to a count of one. Thus, the bulge of the distorted character 9 is detected in scan line 1 and defines section 1 of the scan line 1. This section is labeled S1A in FIGURE 2*a*. The setting of the flip-flop 166 also activates the AND gate 170 since the $\overline{RC}$ signal is already enabling this gate. Thus, the OR gate 168 produces an upper-right stroke signal therefrom indicating that the first stroke detected in a character is classified as an upper-right stroke.

The timing pulses TP are now applied through the AND gate 153 to advance the scan section counters 154 and 156. The first timing pulse applied through the gate 153 in scan line 1 is the pulse TP17. This timing pulse advances the counter 154 from a count of four to a count of five. The next timing pulse TP18 occurring in the timing interval TI18 advances the counter 154 to a count of one and the counter 154 in turn advances the ring counter 156 to a count of two. Therefore, the second section S2A of the scan line 1 begins at the beginning of the timing interval TI18 in FIGURE 2*a*. The second section S2A of the scan line ends at the end of the timing interval TI22 when five timing pulses have advanced the counters to a count of two in counter 156 and five in counter 154. Thus, once the scanning sectionalizer 151 starts, the scan lines and the characters are divided into a plurality of sections or zones each having a duration of five timing pulses or timing intervals. The third section S3A begins at the beginning of the timing interval TI23 and ends at the interval TI27. The fourth section begins at the interval TI28. However, the thirty-first clock pulse counted by the counter 66 (FIGURE 3*a*) occurs during the timing interval TI30. This clock pulse resets the flip-flop 68 and disables the AND gate 70 from producing a thirty-first timing pulse. No further video signals are advanced into the shift register 80 and consequently the bottom of the effective scanning raster is the line 34*a* in FIGURE 2*a*. Additionally, no further advance pulses are applied to the ring counter 154 so that the count in the counters 154 and 156 stops at a count of 3 and a count of 4, respectively. This denotes the third timing pulse in the fourth section.

The counter 66, however, continues to count the clock pulses produced by the clock oscillator 62. On the thirty-seventh pulse, which is effectively the end of the scan, the flip-flop 98 in the stroke detector 90 is reset so that a vertical stroke can be detected in the next scan. This pulse also resets the flip-flop 196 in the restart circuit 190 (FIGURE 3*b*). Additionally, the thirty-seventh pulse activates the AND gate 132 in the horizontal zoning indicator 130 to trigger the flip-flop 134 from the reset to the set state thereof. Thus, one scan line of the right zone has been counted.

The thirty-eighth pulse counted by the counter 66 is applied to the AND gate 222 but is blocked inasmuch as the flip-flop 76 has been set by a black element in this scan. The thirty-ninth pulse counted by the counter 66 is inverted in the inverter 68 and disables the AND gate 64. Thus, no further clock pulses from the clock generator 62 are applied to the counter 66 since the inverted output of the counter disables the AND gate 64. Thus, at the end of scan line 1, the bulge in the center has been detected as the first stroke that occurs in the character and is recorded as an upper-right stroke.

At the start of the scan line 2, the delayed start scan pulse is applied to reset the counter 66 to a count of zero. The ring counters 154 and 156 commence counting from a count of 3 and 4, respectively. Thus, the section S4A appears at both the bottom and top of the scanning raster. The section S4A ends at the timing interval TI2 whereas the section S5A ends at the timing interval TI7. The section S6A begins at the timing interval TI8. The gate 162 in the vertical zoning indicator 160 opens at the beginning of the section S6A due to the signal applied thereto from the sixth stage of the counter 156. A vertical stroke in the numeral 9 is detected in section S6A in scan line 2 because five black elements appear in the register 80. The MVS pulse sets the flip-flop 165 and records that an upper-right stroke has been detected in the right zone of the character. The 1 output terminal of the flip-flop 165 produces a reclassification signal RC from the OR gate 182 which activates the AND gate 172 and deactivates the AND gate 170. Thus, the bulge detected as a stroke in scan line 2 is reclassified into a lower-right stroke. It is to be noted that the upper-left stroke in the left side of the character 9 would also be detected in the section S1A and classified as a lower-left stroke, if the succeeding scan lines are sectioned as in the scan line 1. Such a reclassification would cause a misreading of the numeral 9 by the character reader and result in either an incorrect recognition or a rejection of the character as unreadable. The present arrangement obviates such an occurrence.

The present arrangement recognizes that the bulge detected in scan line 1 is not a true stroke because the stroke is not redetected in the same zone or section in a subsequent scan line. The MVS pulse produced by the vertical stroke activates the AND gate 192 in the restart circuit 190 because the gate 192 is enabled by the flip-flop 196. The flip-flop 196 remains reset to enable the gate 192 because the count 3 and 1 (i.e., the third count in section S1A) has not occurred in the counters 154 and 156, respectively. The activation of the AND gate 192 resets the flip-flop 152 and the flip-flop 152 sets a count of 4 and 1 in the counters 154 and 156, respectively. The OR gate also resets the flip-flop 165 in the indicator 160 and effectively removes the origin of the reclassification signal RC. The flip-flop 166 remains set and the first vertical stroke is classified as an upper right stroke.

The MVS pulse is also delayed one timing interval by the delay circuit 202 before setting the flip-flop 152. The setting of the flip-flop 152 passes the timing pulses to the counters 154 and 156 and starts dividing the scan lines into sections once again. The timing intervals TI9 through TI13 define the new first section labeled in FIGURE 2*a* as S1B.

At the time of the timing interval TI16, ten black elements appear consecutively in the input register 80. Consequently, the AND gate 108 is activated to produce a second MVS pulse in the scan line 2. Since this pulse occurs in section S2B, the AND gate 164 in the zoning indicator 160 is activated and the flip-flop 167 set. The setting of the flip-flop denotes that a lower-right stroke LRS has been detected. Thus, the flip-flops 165 and 167 are set in the indicator 160 and no reclassification RC signal is generated. Therefore, at the end of scan line 2 both an upper and lower-right stroke are recorded as occurring in the character 9. The clock pulse 37 at the end of the scan line 2 resets the flip-flop 144 in the horizontal zoning indicator 140 which in turn sets the next serially connected flip-flop 145. The setting of the flip-flop 145 deactivates the right zone AND gate 147 which in turn deactivates the right zone vertical indicator circuit 160 (FIGURE 3*b*). The center zone AND gate 148 as well as the center zone indicator 160A are activated. The center zone AND gate applies an enabling signal to the AND gate 114 in the short white gap detector 110 as well as to the AND gates 128 and 130 in the detector 121. The MVS pulse detected in the lower-right stroke is also applied to the AND gate 217 in the height detector 215. Since the pulse is detected in section 2B of the scan line, the flip-flop 218 is set denoting that the character has a full character height FCH. Such a feature distinguishes numeric characters from asterisks, periods, dashes and other marks.

In the scan line 3, a horizontal stroke is detected. The first black element is advanced into the shift register 80 at the timing interval TI7 when the top horizontal stroke of the character 9 is detected. At the time of the timing interval TI13, black elements appear in the first, sixth and seventh stages of the register 80 and white elements appear in the other stages. Consequently, the AND gate 114 is activated and the flip-flop 116 is set. The setting of the flip-flop 116 advances the counter 118 to a count of one. At the timing interval TI15, a white element appears in the seventh stage of the register 80 and rests the flip-flop 116.

At the timing interval TI19, the black elements from the middle horizontal stroke of the numeral 9 are in the sixth and seventh stages of the shift register 80, while a black element from the bottom horizontal stroke is in the first stage of the register 80. Therefore, the AND gate 114 is activated and the flip-flop 116 set. The counter 116 is advanced to a count of two and produces an output from the count of two terminals. The output signal is inverted to disable the AND gate 114. The output from the count of two terminals denotes that a from detecting the white gaps. The flip-flop 144 is reset presence of a middle horizontal stroke. At the end of the scan line 3, the flip-flop 144 is again set.

The transition from white to black at the top horizontal stroke of the numeral 9 in the scan line 3 activates the AND gate 122 in the detector 121 and causes the counter 123 to count one black crossing (1BC). The AND gate 125 is also activated to set the flip-flop 127 since the black crossing is detected in section six of the scan line (S6B). However, another black crossing is detected in section one (S1B) of the scan line 3 so that the counter 123 advances to a count of two which disables the gates 128 and 130 and prevents a $\overline{LWG}$ signal from being generated for the numeral 9.

The detector 121 is primarily utilized to detect a distorted numeral 2 which appears as (ᒣ) in a matchstick font and a distorted 5 which appears as (ᒪ). In either of such distorted characters, only one black crossing will be detected in each of the two center zone scans, i.e., scan lines 3 and 4. In the numeral 2, the black crossing is detected in the section S1 of the scan lines whereas in the numeral 5, it is detected in section S6. The counter 132 advances to a count of two for the numeral 2 and activates the AND gate 134 when the lower-left stroke is detected because no lower-right stroke signal appears. For the numeral 5, the counter 133 advances to a count of two and activates the AND gate 135 when the upper-left stroke is detected because no upper-right stroke signal appears.

Referring back to the numeral 9, the scan line 4 produces no signals which are stored because no vertical strokes appear in this scan line and because the counter 118 remains at a count of two inhibiting the AND gate 114 and preventing the short white gap detector 110 from detecting the white gaps. The flip-flop 144 is reset at the end of scan line 4 which resets the flip-flop 145.

The flip-flop 145 in turn sets the flip-flop 146. The left zone AND gate 149 is therefore activated and the AND gate 142 inhibited.

On scan line 5, black video signals start entering the shift register 80 at the time of the timing interval TI8. At the timing interval TI12, five black elements have entered the initial shift register 80. The AND gate 96 in the vertical stroke detector 90 is activated to produce an MVS pulse output denoting a vertical stroke has been detected. At this time the scanning sectionalizer 151 indicates that section S1B of a scan is being scanned. The MVS pulse activates the AND gate 163B and the AND gate 163B produces an output which sets the flip-flop 166B. No reclassification signal is applied to activate the AND gate 172B but the absence of such a signal activates the AND gate 170B to denote that the vertical stroke detected is an upper-left stroke.

Thus, by restarting the scanning sectionalizer 151 when the upper-right stroke of the numeral 9 was detected in a different scan section than the stroke produced by the distorted bulge therein, the upper-left stroke has been detected and correctly located in the character 9.

The scan line 6 produces no additional feature signals that have not been detected before. The scan line 6 is the last scan line in which black video signals are detected. The next scan line is completely off the character 5 so that the flip-flop 76 is not set during this seventh scan line. At the end of scan line 7, the AND gate 232 (FIGURE 3*b*) is activated by the clock pulse 37. Previously, the outputs of the various circuits had ben continuously applied to the feature decoder, 220 which produced an output signal as the various feature signals, lower-right stroke, upper-left stroke, etc., were synthesized into a recognized character. The decoder 220 is effectively a physical exemplification of a Truth Table for the various features that define a character. The decoder 220 produces a separate output signal for each different character recognized. The recognized character signal is passed by the activation of the AND gate 232 so as to be encoded in the encoder 230. The encoder 230 produces an encoded output signal which is applied to an output circuit.

When the clock pulse 38 occurs in the seventh scan, the AND gate 74 in the synchronizer 60 is activated to produce a clear pulse which rests the character 20 for the receipt of the next character's feature signals.

Thus, a character reader which emphasizes the recognition of vertical strokes in a character is provided. The character reader is capable of recognizing distorted characters printed by high speed printers. The character reader utilizes the detection of one feature in a character, i.e., the first vertical stroke detected, to provide a vertical reference point from which the succeeding features are referenced. The succeeding features are referenced to the first stroke detected by dividing each scan line into a plurality of equal sections beginning with section 1, the section in which the detection of the first vertical stroke feature occurs and ascertaining in which section each succeeding feature is detected. Thus, the features of the character are correctly positioned relative to each other. If the first vertical stroke is redetected in a higher position than it was initially detected, the vertical sectionalizing or zoning is restarted to commence from the higher position.

What is claimed is:

1. In a character reader for reading characters from a document, said characters being formed of one or more distinctive features occurring in a plurality of sections in said characters, said system including means for scanning each character to derive signals serially representing the features of said character, the combination comprising, means coupled to said scanning means for detecting a predetermined feature in a character, means for starting the division of the area on said document encompassing said character into a predetermined number of substantially equal vertical sections beginning at a first section when said predetermined feature is detected in a scan line, and means for restarting the division of said area into said predetermined number of vertical sections beginning when said predetermined feature is redetected in a section of a succeeding scan line differing from said first section.

2. In a character reader for reading characters from a document, said characters being formed of one or more distinctive features occurring in a plurality of sections of said characters, said system including means for vertically scanning each character to derive signal serially representing the features of said character, the combination comprising, means for dividing the area on said document encompassing said character into a predetermined number of equal vertical sections beginning at a first section when a predetermined feature is detected in a character, and means for redividing said area into said predetermined number of sections beginning at said first section when said predetermined feature is redetected in a section vertically higher than said first section.

3. In a character reader for reading characters from a document, said characters being formed of one or more distinctive features, the combination comprising, means for detecting a predetermined feature in a character, second means for establishing a first reference point based on the detection of said predetermined feature to determine the relative location of the other features within the character, said second means dividing the area encompassing said character into a predetermined number of equal sections beginning with a first section defined by said first reference point, third means for establishing a second reference point to determine the relative location of the other features within said character when said predetermined feature is redetected in a section differing from said first section, and said third means redividing said area into said predetermined number of sections beginning with said first section defined by said second reference point.

4. In a character reader for reading characters from a document, said characters being formed of one or more distinctive features, the combination comprising, means for scanning said character by a plurality of scan lines to produce video signals serially representing the features of said characters, means for counting said scan lines to determine the horizontal location within a character from which the feature signals were produced, means for detecting a predetermined feature signal in one of said scan lines, means for starting the division of said one scan line and succeeding scan lines into a predetermined number of equal vertical sections, the first section being formed when said predetermined feature is detected, means for restarting the division of said succeeding scan lines when said predetermined feature is redetected in a section differing from said first section, means for detecting the other feature signals in said succeeding scan lines of said character, and means for comparing the sections in which the said other features are detected with the section of said predetermined feature to determine the vertical location within a character from which the feature signals are produced.

5. In a character reader for reading characters from a document, said characters being formed of one or more distinctive features, the combination comprising, means for scanning said character by a plurality of scan lines to produce video signals serially representing the features of said characters, means for counting said scan lines to determine the horizontal location within a character from which the feature signals were produced, means for detecting a vertical stroke in a scan line of said character, means for starting the division of said one scan line and succeeding scan lines into a predetermined number of equal vertical sections, the first section being formed when a vertical stroke is first detected in a character, means for restarting the division of said succeeding scan lines when said first vertical stroke is redetected in a section differing from said first section, means for detecting the remaining vertical strokes in succeeding scan lines of said character, and means for comparing the sections in which the said remaining vertical strokes are detected with the section of said predetermined feature to determine the vertical location within a character of the said remaining vertical strokes.

6. In a character reader for reading characters from a document, said characters being formed of distinctive features including vertical strokes, the combination comprising, means for scanning successive characters by a plurality of vertical scan lines to produce video signals serially representing the features of said characters, a vertical stroke detector coupled to said scanning means for detecting a vertical stroke occurring in a character, means coupled to said scanning means for counting said scan lines to determine the horizontal location within a character from which a vertical stroke is detected, means for dividing said scan lines into a predetermined number of equal vertical sections commencing with a first section, means coupling said vertical stroke detector to said dividing means to initiate said division when a vertical stroke is first detected in a character, means for restarting the division of said scan lines when said first vertical stroke is redetected in a section of said scan lines higher than said first section, means for detecting the remaining vertical strokes in succeeding scan lines of said character, and means for comparing the sections in which the said remaining vertical strokes are detected with the first section to determine the vertical location within a character of the said remaining vertical strokes.

References Cited by the Examiner

UNITED STATES PATENTS

| | | | |
|---|---|---|---|
| 3,142,818 | 7/1964 | Holt | 340—146.3 |
| 3,199,808 | 8/1965 | Rabinow et al. | 340—146.3 |
| 3,217,294 | 11/1965 | Gerlach et al. | 340—146.3 |

MAYNARD R. WILBUR, *Primary Examiner.*

D. W. COOK, *Examiner.*

J. E. SMITH, *Assistant Examiner.*